United States Patent
Martin et al.

(10) Patent No.: US 10,402,600 B1
(45) Date of Patent: Sep. 3, 2019

(54) MOBILE TRAY FOR PERFORMING RFID READS

(71) Applicant: Amazon Technologies, Inc., Seattle, WA (US)

(72) Inventors: James Gergory Martin, Seattle, WA (US); Allan Scott Bathurst, Seattle, WA (US); Matthew Bartol, Seattle, WA (US); Oleg Kantor, Kirkland, WA (US); Nelson Andres Ramon, Seattle, WA (US); Will Tyler Seidelman, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/798,103

(22) Filed: Oct. 30, 2017

(51) Int. Cl.
*G06K 7/10* (2006.01)
*G06Q 10/08* (2012.01)

(52) U.S. Cl.
CPC ....... *G06K 7/10316* (2013.01); *G06Q 10/087* (2013.01)

(58) Field of Classification Search
CPC .......... G06K 7/10316; G06K 7/10128; G06K 19/0723; G06K 19/07773; G06K 2017/0051; A61B 50/33; A61B 90/98; A61B 2050/185; G06Q 10/087; G06Q 50/28; G06F 1/182; G07G 1/009; H01Q 1/2216
USPC ...................................................... 235/385
See application file for complete search history.

(56) References Cited

U.S. PATENT DOCUMENTS

| | | | | |
|---|---|---|---|---|
| 3,902,177 | A * | 8/1975 | Mori | H01Q 7/04 343/741 |
| 4,736,277 | A * | 4/1988 | Brown | H01M 2/1022 29/840 |
| 2006/0043177 | A1* | 3/2006 | Nycz | G06Q 10/087 235/385 |
| 2008/0001760 | A1* | 1/2008 | Oh | G06K 7/10316 340/572.7 |
| 2010/0045436 | A1* | 2/2010 | Rinkes | H04Q 9/00 340/10.1 |
| 2011/0181394 | A1* | 7/2011 | Blair | A61B 5/062 340/10.1 |

(Continued)

OTHER PUBLICATIONS

U.S. Patent Application entitled "Container Holding Fixtures", filed Sep. 29, 2016, U.S. Appl. No. 15/280,735.

*Primary Examiner* — Seung H Lee
(74) *Attorney, Agent, or Firm* — Patterson + Sheridan, LLP

(57) ABSTRACT

Embodiments herein describe an RFID reader tray which includes a receptacle for detecting RFID tags disposed on physical items. In one embodiment, a sidewall is disposed around the periphery of a bottom support structure and extends away from the bottom support structure to form the receptacle. The reader tray includes an RFID antenna disposed under the bottom support structure on which the items can be placed. The material of the bottom support structure is selected such that RFID signals emitted by the RFID antenna can radiate through the bottom support structure and reach RFID tags placed on items in the receptacle. In one embodiment, the reader tray includes a shield for reflecting the RFID signals so that the most of the RFID signals radiate through the bottom support structure and into the receptacle.

16 Claims, 8 Drawing Sheets

(56) References Cited

U.S. PATENT DOCUMENTS

| | | | |
|---|---|---|---|
| 2011/0204565 A1* | 8/2011 | Gelinotte | A63F 1/06 |
| | | | 273/237 |
| 2011/0227703 A1* | 9/2011 | Kotab | G07F 17/32 |
| | | | 340/10.1 |
| 2012/0025988 A1* | 2/2012 | Harada | B01L 3/5453 |
| | | | 340/572.1 |
| 2012/0229258 A1* | 9/2012 | Lim | G06K 7/10128 |
| | | | 340/10.1 |
| 2013/0093591 A1* | 4/2013 | Campero | G06K 7/0008 |
| | | | 340/572.1 |
| 2014/0210598 A1* | 7/2014 | Mitchell | G06K 7/0008 |
| | | | 340/10.5 |
| 2015/0372395 A1* | 12/2015 | Lavedas | H01Q 21/28 |
| | | | 343/748 |
| 2016/0239905 A1* | 8/2016 | Wong | G06Q 30/06 |
| 2017/0196128 A1* | 7/2017 | Elizondo, II | G06F 1/182 |
| 2017/0286903 A1* | 10/2017 | Elizondo, II | H04B 17/318 |
| 2018/0089474 A1* | 3/2018 | Ramon | G06K 7/10316 |

* cited by examiner

MOBILE TRAY FOR PERFORMING RFID READS

BACKGROUND

Items may be moved throughout material handling facilities on moveable carts. Such carts may be moveable by a human (e.g., an associate) and can hold multiple items. Human operators may place and remove items into and out of receptacles held by the moveable cart. These processes of placing and removing items may be performed as part of adding new items to a material handling facility, moving existing items to different locations in the material handling facility, and removing items from the material handling facility.

Further, an associate may be tasked with inventorying items stored in the material handling facility (e.g., a warehouse), especially high retail value (HRV) items—e.g., luxury goods. To do so, the associate can use the cart to collect stowed HRV items and then count those items to make sure the inventory count matches records stored in a database from a previous inventory check or when the items were initially stowed in the warehouse. For example, the associate may provide a physical count to the database or scan a bar code on each item. This process requires a lot of time and is susceptible to human error.

BRIEF DESCRIPTION OF DRAWINGS

Various embodiments in accordance with the present disclosure will be described with reference to the drawings, where like designations denote like elements.

DETAILED DESCRIPTION

Embodiments herein describe an RFID reader tray which includes a receptacle for detecting RFID tags disposed on physical items—e.g., items stored in a warehouse. In one embodiment, a sidewall (or sidewalls) is disposed around the periphery of a bottom support structure and extends away from the bottom support structure to form the receptacle for holding the items. Stated differently, a top surface of the bottom support structure and the sidewall can form a receptacle in which an associate can place items with RFID tags. The reader tray includes at least one RFID antenna disposed under the bottom support structure. In one embodiment, the RFID antenna faces a bottom surface of the bottom support structure that is opposite the top surface. The material of the bottom support structure is selected such that RFID signals emitted by the RFID antenna can radiate through the bottom support structure and reach RFID tagged items in the receptacle. In one embodiment, the reader tray includes a shield disposed on the opposite side of the RFID antenna facing the bottom support structure for reflecting the RFID signals so that the most of these signals radiate through the bottom support structure and into the receptacle. An RFID reader can use the RFID antenna to receive RFID reply signals from the RFID tags. In this manner, the RFID reader tray can detect and identify RFID tagged items placed in the receptacle.

In one embodiment, the RFID reader tray is mounted in a mobile cart and can be used to inventorize RFID tagged items in a warehouse. An associate may retrieve items stowed in containers or on shelves in the warehouse and place those items (which have RFID tags) in the receptacle of the RFID reader tray. The RFID reader can identify the RFID tags in its read region and communicate with an inventory tracking system to identify the items placed in the receptacle. The inventory tracking system determines whether the items are all accounted for, or if an item is missing, and can instruct the associate to perform an appropriate action.

Figure 1:
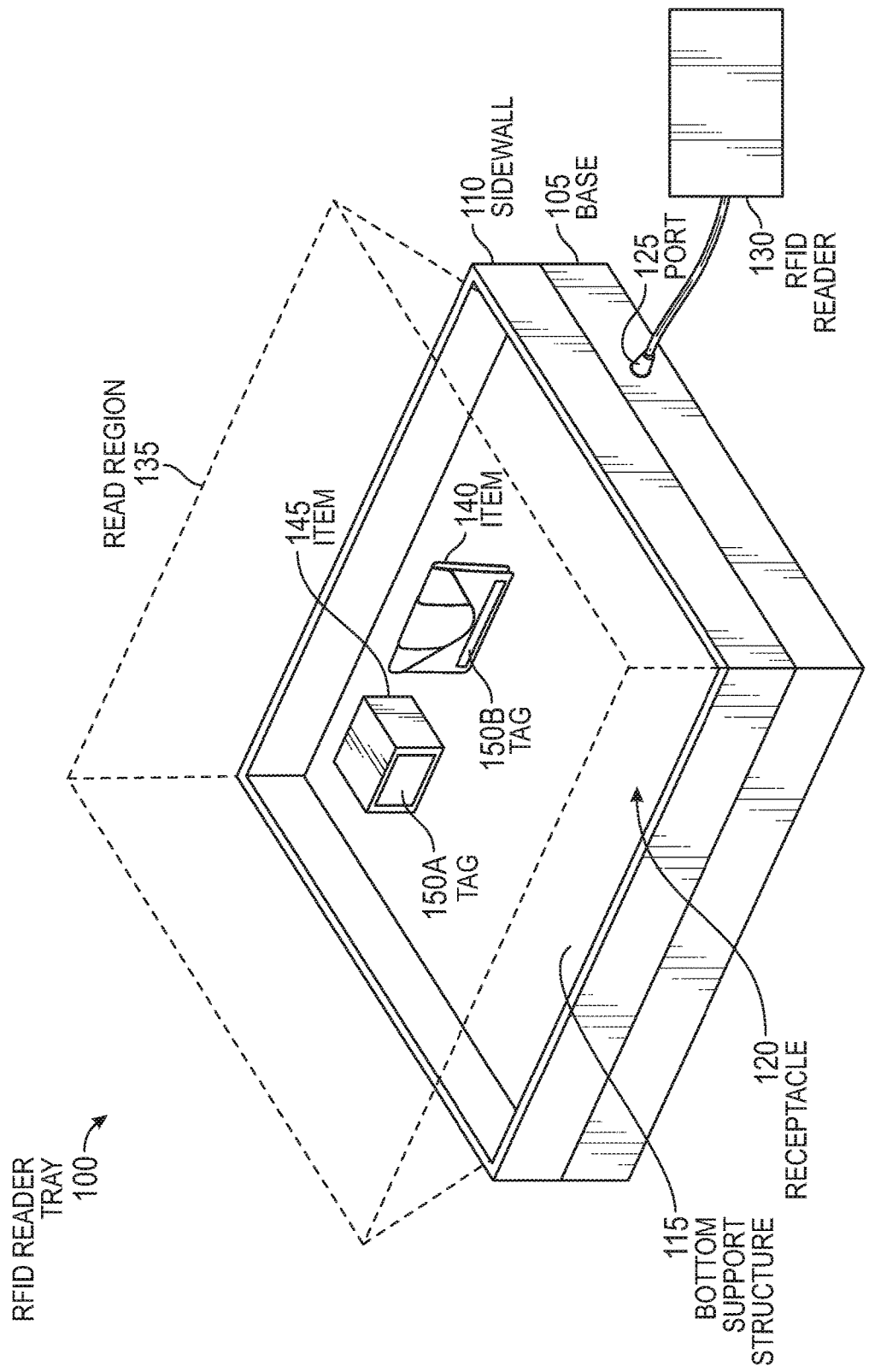
FIG. 1 illustrates a RFID reader tray, according to various embodiments.

FIG. 1 illustrates a RFID reader tray 100, according to various embodiments. The tray 100 includes a base 105 on which a planar bottom support structure 115 is disposed. Although not shown, an RFID antenna is disposed in the base 105 which includes a port 125 for coupling the RFID antenna to an RFID reader 130. The base 105 can be made from any material (e.g., metal, plastic, etc.) which provides support for the RFID antenna and the bottom support structure 115.

In one embodiment, the bottom support structure 115 provides a surface for disposing items (e.g., items 140 and 145) onto the tray 100. The bottom support structure 115 can be made from any rigid material that can support multiple items being disposed thereon. The number and weight of the items that an associate may place on the bottom support structure 115 may determine the material and its thickness used for the bottom support structure 115. For example, if heavy items such as books or liquids are placed on the tray 100, the bottom support structure 115 may be thicker or made from a stronger material than if only lighter items such as purses or watches are placed on the tray 100.

In one embodiment, the material of the bottom support structure 115 permits RFID signals emitted by the RFID antenna in the base 105 to pass, or radiate, through the bottom support structure 115. For example, the bottom support structure 115 may be formed from a dielectric material such as a non-conductive plastic or other rigid dielectric material which allows electromagnetic signals such as RFID signals (e.g., low frequency (LF) (approximately 125-135 kHz), high frequency (HF) (approximately 13.5 MHz), ultra-high frequency (UHF) (approximately 860-960 MHz), or super high frequency (SHF) (approximately 2.45 GHz) RFID frequency ranges) to pass through the bottom support structure 115 without attenuating or scattering the RFID signals. As such, the RFID signals emitted by the RFID antenna in the base 105 can pass through the bottom support structure 115 and reach RFID tags 150 on the items 140 and 145.

The RFID tags 150 can be passive or active tags. In either case, in one embodiment, the RFID tags 150 receive the RFID signals emitted by the RFID antenna and transmit RFID reply signals which pass through the bottom support structure 115 and are received by the RFID antenna. The RFID reply signals can include modulated data which indicates a unique RFID ID corresponding to each RFID tag 150. The RFID reader 130 can demodulate the RFID reply signals received on the RFID antenna and determine the ID for each of the RFID tags 150. Using the unique IDs, an inventory tracking system (not shown) can determine which items are in the RFID reader tray 100. That is, the inventory tracking system can use the unique IDs corresponding to the RFID tags 150A and 150B to determine that the item 140 and 145 are currently disposed on the tray 100.

The tray 100 also includes a sidewall 110 disposed around the periphery of the bottom support structure 115. Moreover, the sidewall 110 extends away from the bottom support structure 115. Although FIG. 1 illustrates that the sidewall 110 extends in a direction perpendicular to the surface of the bottom support structure 115 on which the items are disposed, in other embodiments, the sidewall may be sloped at a non-ninety degree angle relative to the bottom support structure 115. In so doing, the sidewall 110 and the bottom support structure 115 combine to define a receptacle 120 in which the items are disposed. That is, the bottom support structure 115 provides support for holding the items while the sidewall 110 keeps the items from falling over the sides of the bottom support structure 115 and off the tray 100. The height of the sidewall 110 (i.e., the distance the sidewall 110 extends from the bottom support structure 115) may vary depending on the intended use of the tray 100. For example, if the tray 100 is used to inventorize small items (e.g., watches, rings, necklaces, and other jewelry) the height of the sidewalls 110 can be smaller than if the tray 100 is used to inventorize larger items such as purses, shoes, or large electronic devices. In one embodiment, the height of the sidewall 110 ranges from a 2 centimeters to 20 centimeters.

The area of the bottom support structure 115 and the size of the receptacle 120 can vary depending on the application. For example, if the tray 100 is used to scan tags disposed on larger items, then the area of the bottom support structure 115 may be increased and vice versa. In one embodiment, the area of the bottom support structure 115 is designed to fit into a cart so the tray 100 can be mounted into the cart for mobile transport throughout a warehouse. In one embodiment, the width and length of the bottom support structure 115 and the receptacle 120 range from 15 centimeters to 150 centimeters.

In FIG. 1, the sidewall 110 establishes four sides to form the rectangular shaped receptacle 120, however other shapes are also suitable. For example, the bottom support structure 115 and the sidewall 110 may be curved to form a circular or elliptical receptacle 120. In another example, the sidewall 110 may include more or fewer sides than the four sides shown in FIG. 1. In some embodiments, the receptacle may include a lid disposed on the sidewall 115. Moreover, although in FIG. 1 the sidewall 110 is placed at the outer edges of the bottom support structure 115, in another embodiment the sides of the sidewall 110 are moved towards the center of the bottom support structure 115 such that there is a lip or portion of the bottom support structure 115 that is not within the receptacle 120. Put differently, the sidewall 110 may enclose only a portion of the bottom support structure 115. Doing so may be useful to avoid dead spots or dead zones at the corners of the receptacle 120 where the RFID signals emitted by the RFID antenna may be weaker or do not reach. Moreover, although shown as extending all the way around the periphery of the bottom support structure 115, the sidewall 110 may still enclose all or some of the top surface of the bottom support structure 115 without forming a continuous wall. For example, the sidewall 110 may have intermittent breaks or may only have three sides while a fourth side is left open to make it easier for an associate to slide a container holding the RFID tagged items into the receptacle 120.

FIG. 1 also illustrates a read region 135 shown using dotted lines which graphically represent a volume in space above the tray 100 in which the RFID reader 130 can detect the RFID tags 150 using the signals emitted by the RFID antenna in the base 105. The read region 135 is shown as a cubic volume but in reality may be curved and have protrusions that extend above and to the sides of the sidewall 110. In one embodiment, the sidewall 110 is made of a conductive material (e.g., a metal) which reflects the signals emitted by the RFID antenna. Doing so may concentrate the RFID region in the receptacle 120. However, as shown, the read region 135 can extend beyond the sidewall 110 in the region above the receptacle (e.g., above the sidewall 110). Generally, the RFID reader 130 can detect a tag 150 when it enters the read region 135 although its ability to do so may be inhibited if the item (or items) in the read region 135 include materials that absorb or block/reflect the RFID signals. For example, if the items are metallic, the RFID reader 130 may be unable to detect a tag 150 on a item stacked on other items because the metallic portions of the underlying items may block or scatter the RFID signals emitted through the bottom support structure 115 such that these signals do not reach the tag 150 disposed on the item at the top of the stack. In another example, liquid bottles with RFID tags (e.g., perfume, shampoo, lotion, etc.) can absorb or block RFID signals which may prevent stacked items from being detected by the RFID reader 130. Thus, the ability of the RFID reader 130 to detect the tag 150 in the read region 135 may depend on the material of the item and how the items are arranged when placed in the receptacle 120.

Figure 2:
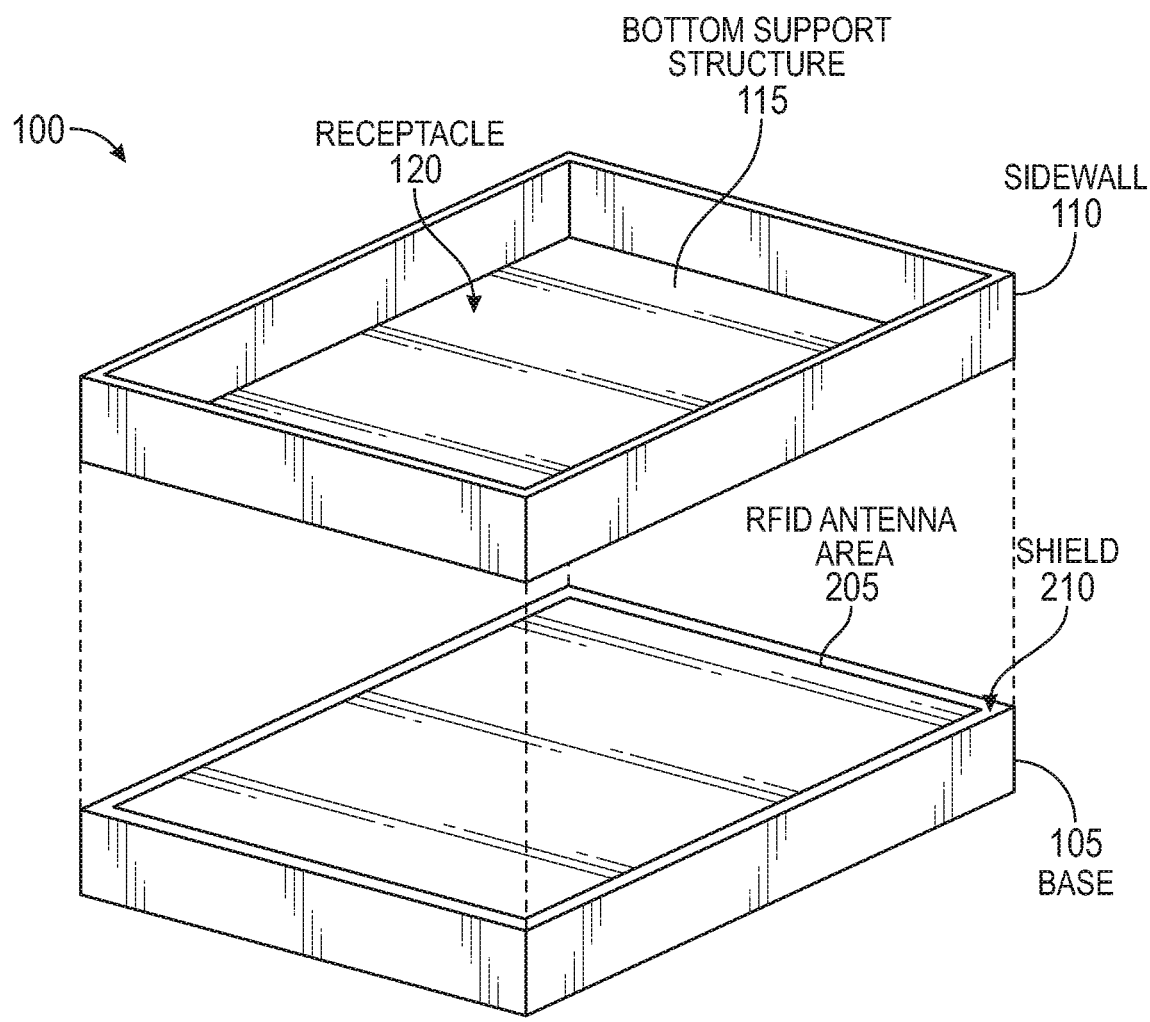
FIGS. 2 and 3 illustrate exploded views of the RFID reader tray in FIG. 1, according to various embodiments.
Figure 3:
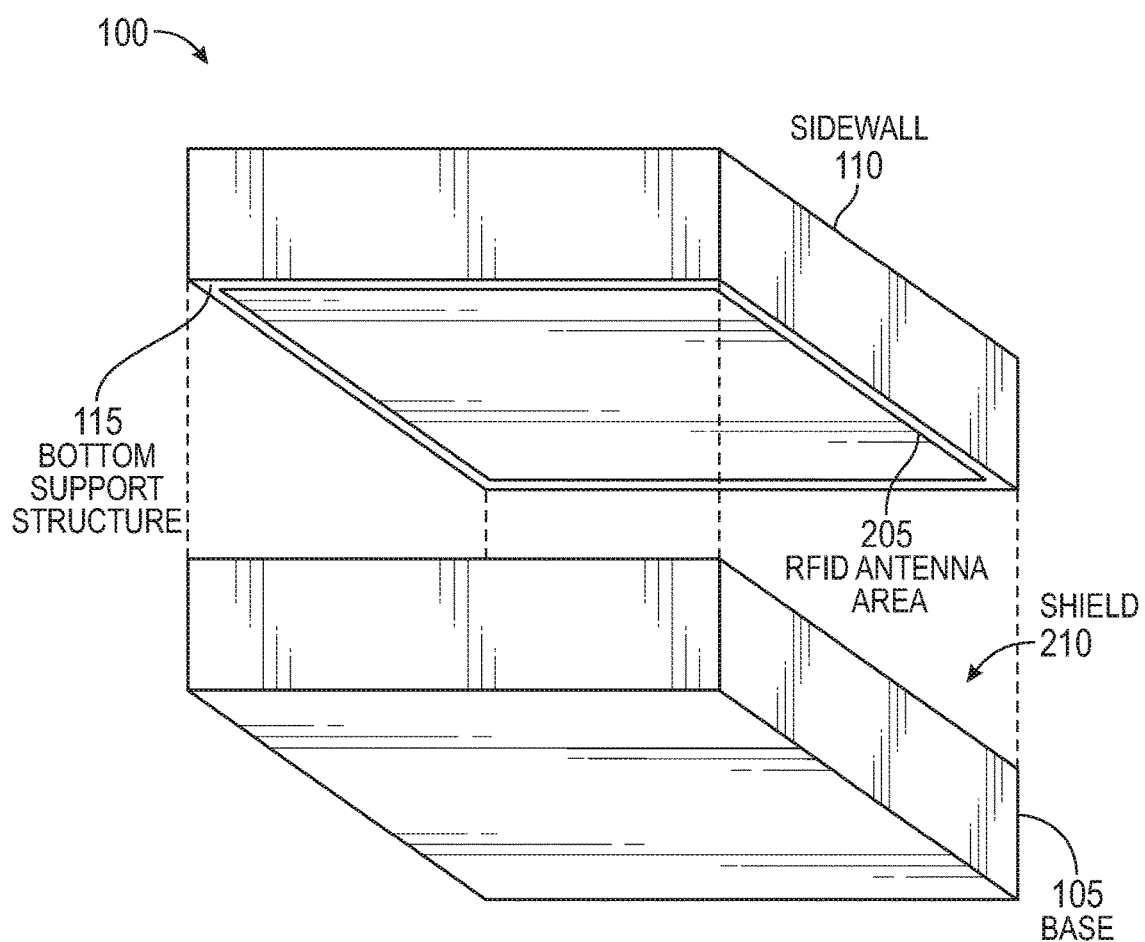

FIGS. 2 and 3 illustrate exploded views of the RFID reader tray in FIG. 1, according to various embodiments. Specifically, FIG. 2 illustrates the base 105 detached from the bottom support structure 115 and the sidewall 110. In one embodiment, fastening elements (e.g., adhesive, screws, clips, etc.) are used to connect the base 105 to the bottom support structure 115 and the sidewall 110, although in other embodiments the base 105 and the bottom support structure 115 are a unitary piece.

As shown, the base 105 includes a planar shield 210 which is parallel to the bottom support structure 115. That is, when coupled to the base 105, the bottom support structure 115 and the shield 210 are in a facing relationship. A RFID antenna area 205 on the shield 210 may include one or more RFID antennas (not shown). In this example, the RFID antenna (or antennas) is fastened onto the shield 210 such that RFID antenna is between the shield 210 and the bottom support structure 115. In one embodiment, the shield 210 is made from a material which reflects the RFID signals emitted by the RFID antennas. That is, the shield 210 prevents the RFID signals from passing into the base 105, and instead reflects these signals up in a direction towards the bottom support structure 115. In this manner, the shield 210 focuses the RFID signal into the receptacle 120 defined by the bottom support structure 115 and the sidewall 110. The shield 210 may include a conductive metal or any other material that reflects electromagnetic signals.

Like FIG. 2, FIG. 3 illustrates an exploded view of the tray 100. However, in this example, the RFID antenna area 205 is disposed on the bottom support structure 115 indicating that the RFID antennas may be fastened to this surface rather than the shield 210 as shown in FIG. 2. In either case, the RFID antenna area 205 is between the bottom support structure 115 and the shield 210 such that the RFID signals emitted by the RFID antenna are reflected by the shield 210 towards the bottom support structure 115.

In one embodiment, instead of placing the shield 210 at the top of the base 105 (as shown in FIGS. 2 and 3), the shield 210 may be at the bottom of the base 105. In this example, the top of the base 105 may be open and the bottom surface of the base 105 can serve as the shield. Although doing so moves the shield 210 further from the RFID antenna area 205, the shield can still reflect signals emitted by the RFID antenna up towards the bottom support structure 115. Moreover, the sides of the base 105 (e.g., the surfaces that are perpendicular to the bottom support structure 115 and the shield 210) can be made of a material that reflects the RFID signals thereby increasing the ability of the tray 100 to focus the emitted RFID signal up through the bottom support structure 115 and into the receptacle formed by the sidewall 110.

Figure 4:
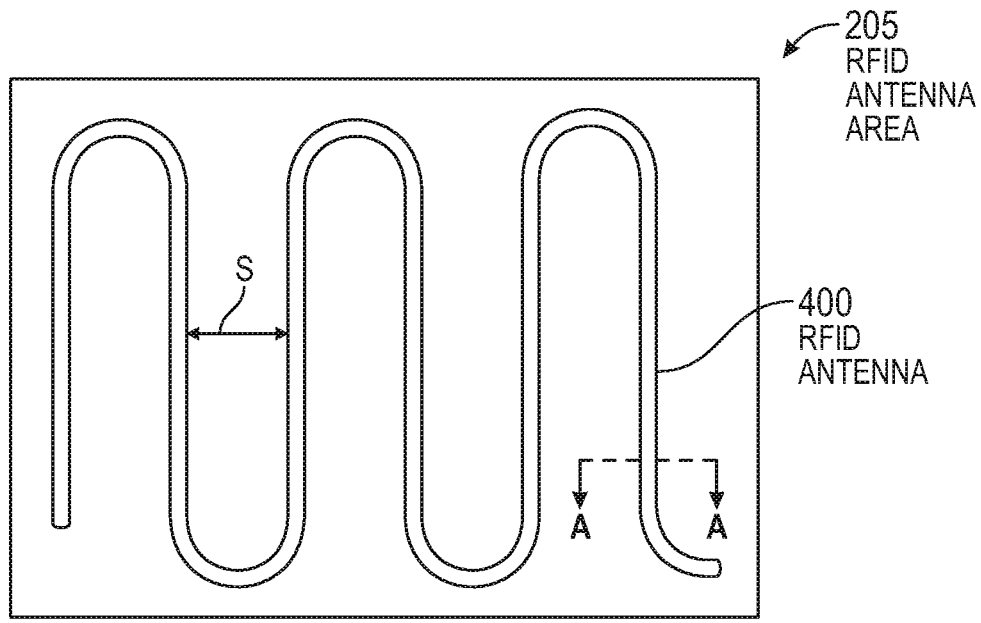
FIG. 4 illustrates an RFID antenna used in an RFID reader tray, according to various embodiments.

FIG. 4 illustrates an RFID antenna 400 used in an RFID reader tray, according to various embodiments. As shown, the RFID antenna area 205 includes the RFID antenna 400 which emits the RFID signals to form the read region 135 shown in FIG. 1. In this example, the RFID antenna 400 includes a single electrically conductive annular structure which snakes through the RFID antenna area 205. That is, the RFID antenna 400 extends vertically until approaching the boundary of the RFID antenna area 205 and then bends to extend in the reverse direction. Starting from one side, the RFID antenna 400 is snaked across the area 205 by reversing the direction of the antenna 400 until a second end of the antenna 400 is at the second, opposite side of the area 205. Although the bends are shown as being curved half-circles, they can take any shape that permits the antenna 400 to reverse directions. However, bending the antenna 400 to form a gradual turn rather than a sharp turn (or making a sharp ninety degree turn) may be preferred since tight turns can harm the antenna 400 by causing fraying or increasing its electrical resistance thereby affecting the ability of the antenna 400 to emit the RFID signals.

The spacing (S) between the RFID antenna 400 as it snakes across the area 205 may vary depending on the desired signal strength and the radiation pattern of the antenna 400. For example, if the antenna 400 emits a large radiation pattern, than a larger spacing (S) may be permitted and still establish a read region that covers the entire area of the bottom support structure (not shown here). As the signal strength or the radiation pattern decreases, the spacing (S) may also decrease so that the antenna 400 continues to form a read region which covers the bottom support structure. In this manner, regardless of where an item is disposed on the bottom support structure, the tag on the item can receive the RFID signals emitted by the antenna 400.

In one embodiment, the RFID antenna 400 is formed using a continuous annular structure where both ends of the structure is coupled to the RFID reader in order to transmit the RFID signal to the tag as well as receive RFID reply signals from the tags. In another embodiment, the RFID antenna 400 may include several discrete RFID antennas which are coupled end-to-end to form the antenna 400. The discrete antennas at each end of the RFID antenna 400 can be coupled to the RFID reader. In other embodiments, the RFID antenna area 205 may include multiple separate RFID antennas. For example, the area 205 may include multiple antennas disposed side-by-side which each extend vertically from the bottom side of the RFID antenna area 205 to its top side. Each end of the multiple antennas can be connected to the same RFID reader (e.g., different ports in the same reader) or different RFID readers. Other shapes of the antennas are also possible. For example, multiple small circular antennas can be laid out in a grid in the RFID antenna area 205 that has multiple rows and columns.

Figure 5:
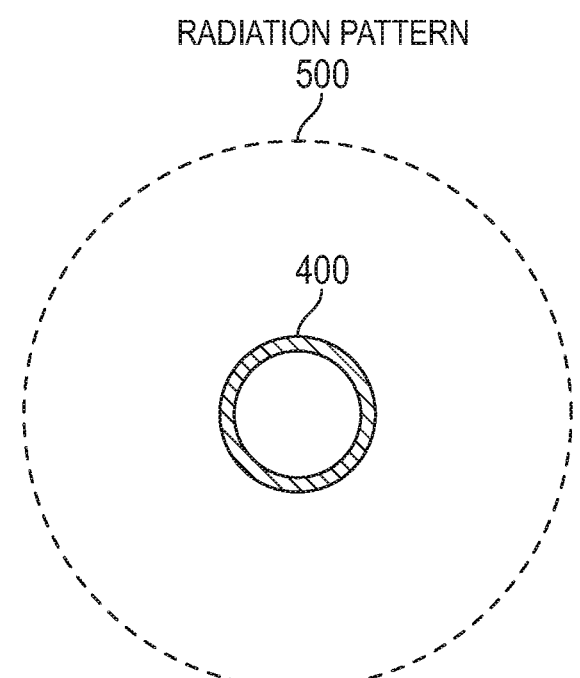
FIG. 5 illustrates a cross sectional view of the RFID antenna in FIG. 4, according to various embodiments.

FIG. 5 illustrates a cross sectional view of the RFID antenna 400 in FIG. 4, according to various embodiments. Specifically, FIG. 5 illustrates the cross section of the RFID antenna 400 along the line labeled A-A. As shown, the cross section illustrates a hollow tubular or cylindrical structure. The diameter of the cylindrical structure can vary depending on the application. Moreover, the antenna 400 forms an omnidirectional radiation pattern 500 where the emitted RFID signals radiate substantially equally around the antenna 400. Thus, the RFID antenna may be referred to as an omnidirectional antenna. As discussed below, however, the shield and other conductive surfaces in the tray can be used to change the radiation pattern of the antenna 400 into a directional antenna. That is, the combination of the shield and the antenna 400 form a directional antenna which focuses most of the emitted RFID signals towards the bottom support structure.

Figure 6:
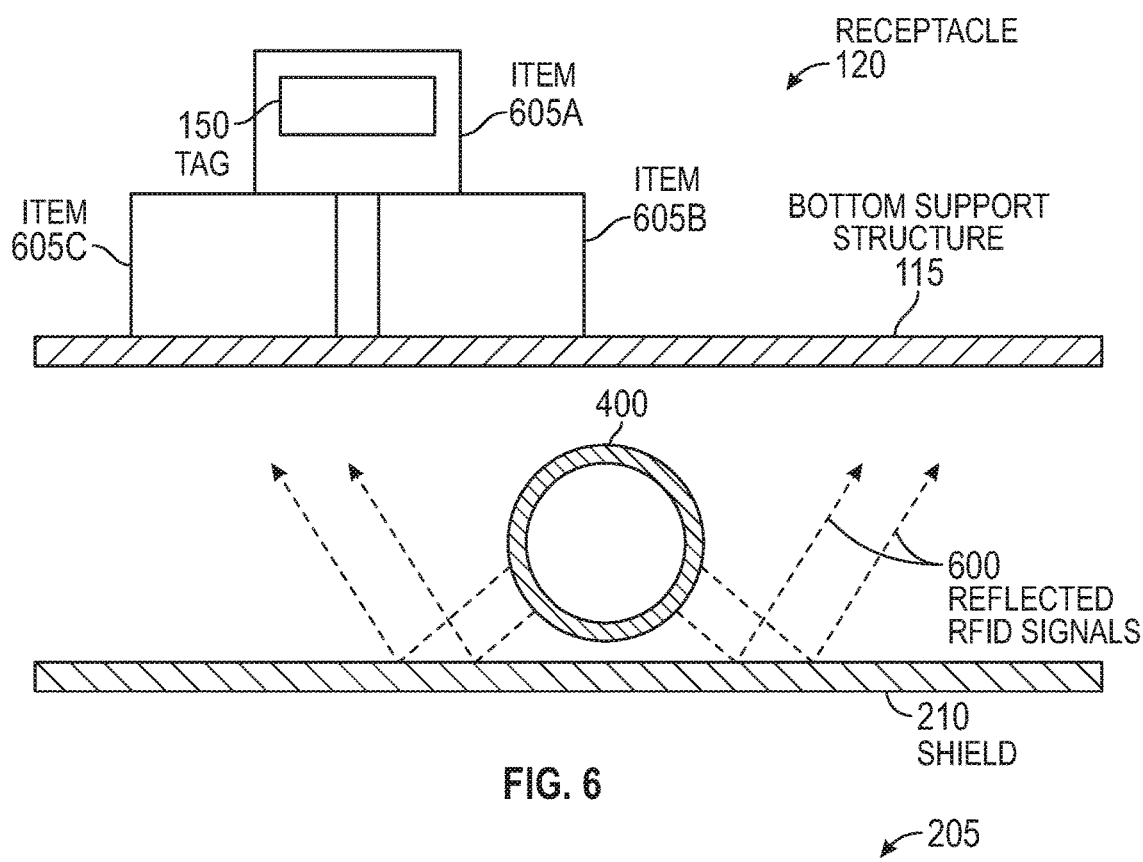
FIG. 6 illustrates reflecting RFID signals emitted by an RFID antenna, according to various embodiments.

FIG. 6 illustrates reflecting RFID signals 600 emitted by an RFID antenna 400, according to various embodiments. For clarity, FIG. 6 illustrates the path taken by just a few of the RFID signals 600 (or electromagnetic waves) emitted by the antenna 400. As shown, some of the signals 600 are emitted by the antenna 400 towards the shield 210. However, as discussed above, it may be advantageous to focus the signal 600 emitted by the antenna 400 into the receptacle 120 to increase the ability of the RFID read to detect the tags 150 on items 605 placed in the receptacle 120.

The signal 600 emitted toward the shield 210 are reflected in a direction towards the bottom support structure 115. Because the bottom support structure 115 may include a material that is transmissive for the RFID signals 600, these signals 600 can radiate through the bottom support structure 115 and into the receptacle 120 where they can be received by the tags 150. In this manner, the shield 210 deforms the radiation pattern corresponding to the antenna 400 such that the signals are primary focused in the region above the bottom support structure 115, thereby changing the antenna 400 into a directional antenna. By focusing the signals 600 in the receptacle 120, the tray 100 can increase the likelihood that the RFID reader can detect the tag 150 in the item 605A which is stacked on the items 605B and 605C without increasing the transmit power of the antenna 400. Put differently, without the shield 210, the tag 150 may be outside of the radiation pattern and the read region of the antenna 400. However, with the shield 210 (and without increasing the transmission power used to drive the antenna 400), the radiation pattern and read region can be extended to include the tag 150 such that the tag 150 can be detected by the RFID reader.

The shield 210 may also help the RFID reply signals emitted by the tags 150 to reach the antenna 400. For example, when replying to the RFID signals, the tag 150 may transmit RFID signals in many different directions. However, any RFID reply signals emitted by the tags 150 are also reflected by the shield 210, and depending on the incident angle, can be reflected such that RFID reply signals are received by the antenna 400. As such, the shield 210 can improve the ability of the RFID antenna 400 to receive the reply signals from the tags 150 as well as improve the ability of the tray 100 to detect tags in the receptacle 120.

Although not shown, the sidewall disposed on the bottom support structure 115 may also reflect the RFID signals emitted by the antenna 400 to focus the RFID signals in the receptacle 120. For example, the sidewall may reflect signals emitted by the antenna 400 in a direction back into the receptacle 120. That is, the sidewall can prevent the RFID signals from escaping the receptacle 120. In this manner, the sidewall can also be referred to a shield which affects the directionality of the RFID antenna 400.

Figure 7:
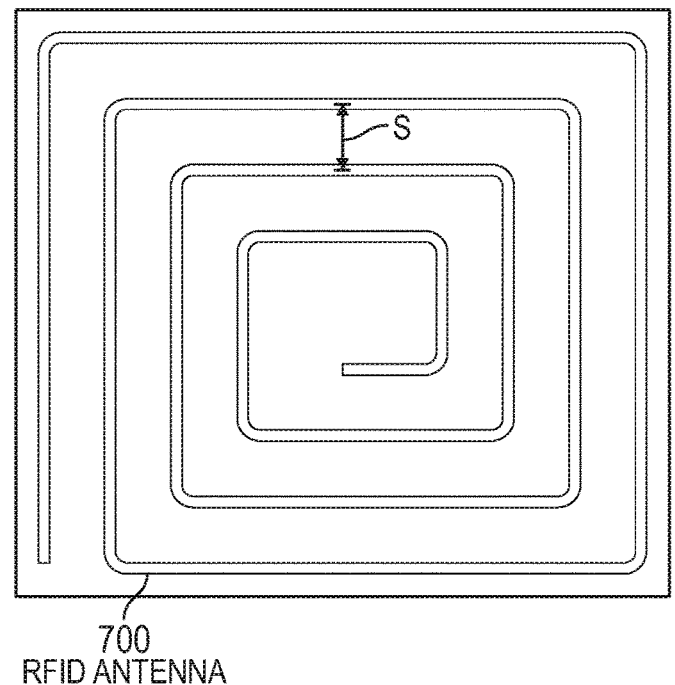
FIG. 7 illustrates an RFID antenna used in an RFID reader tray, according to various embodiments.

FIG. 7 illustrates an RFID antenna 700 used in an RFID reader tray, according to various embodiments. In this example, the RFID antenna 700 forms a coil in the RFID antenna area 205. Like in FIG. 4, the ends of the antenna 700 can be formed using an annular (e.g., cylindrical or tubular) structure where the ends are coupled to the RFID reader in order to detect tags. As shown, a first end of the annular structure is disposed on the periphery of the RFID antenna area 205 while a second end of the structure is located at a center portion of the area 205. The radiation pattern of the antenna 700 may be similar to the radiation pattern 500 shown in FIG. 5. Thus, when placed between the shield 210 and the bottom support structure 115 as shown in FIG. 6, the omnidirectional RFID antenna 700 can be converted into a directional antenna.

The RFID antenna 700 may be formed from a single, continuous antenna or from multiple antennas coupled end-to-end. Further, the spacing (S) between each of the coils can vary depending on the transmission power and the size of the resulting radiation pattern. For example, as the transmission power and radiation pattern increase, the number of coils (or the spacing between the coils) may decrease.

In one embodiment, instead of using the shield to form a directional antenna from the omnidirectional antennas 400 and 700, the base may include one or more directional antennas. However, large directional antennas which can generate a read region that covers the bottom support structure in a tray are expensive and rare. For example, to cover the entire area of the bottom support structure (which may be large to accommodate multiple large items—e.g., purses, shoes, etc.) multiple directional antennas may be distributed in a grid in the RFID antenna area 200. However, doing so increases cost and the weight of the tray. Moreover, the directional antennas may draw more power than the RFID antennas 400 and 700 which may limit the tray when used in mobile applications that rely on battery power.

Figure 8:
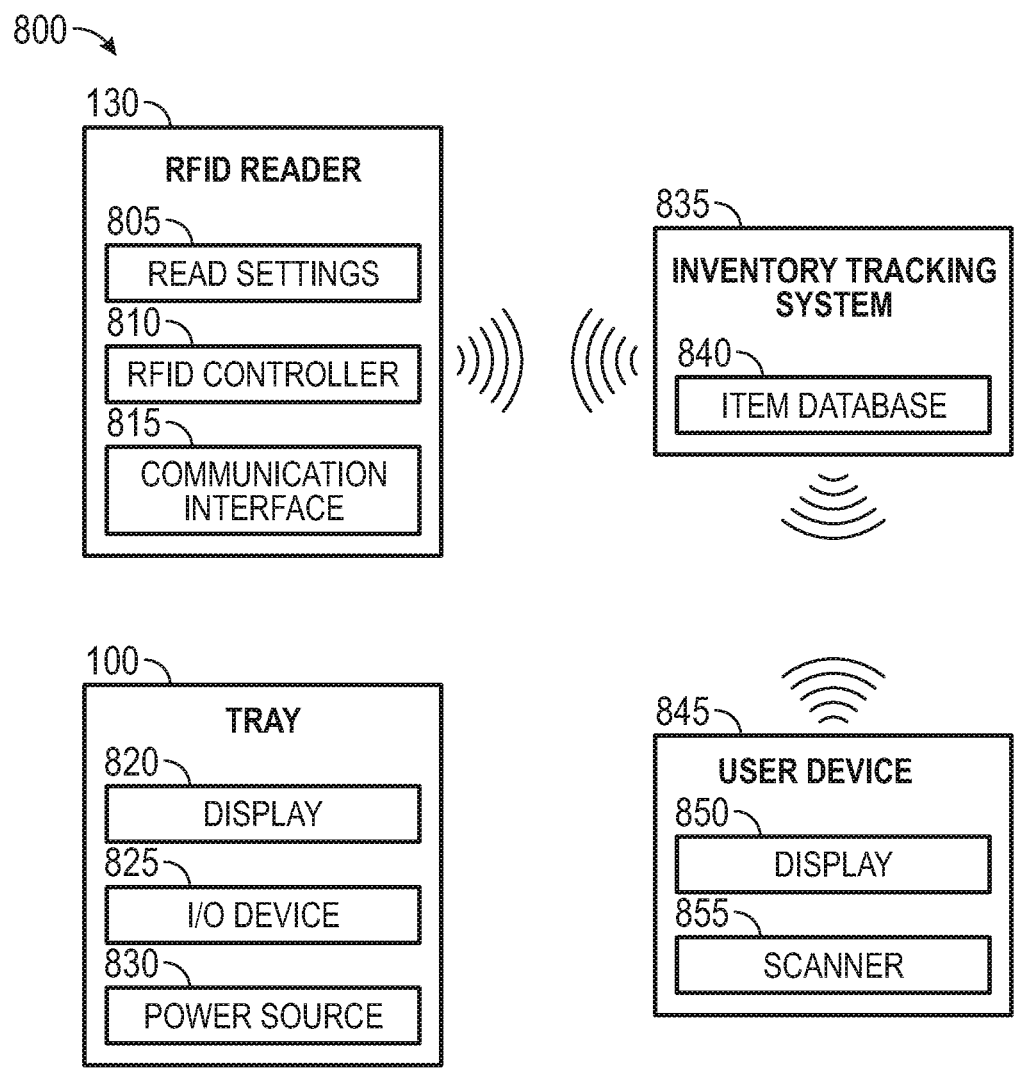
FIG. 8 is a block diagram of a system for detecting RFID tags using an RFID reader tray, according to various embodiments.

FIG. 8 is a block diagram of a system 800 for detecting RFID tags using the RFID reader tray 100, according to various embodiments. In addition to the various structural elements described above, in this embodiment, the tray 100 includes a display 820, an input/output (I/O) device 825, and a power source 830 which are optional. The display 820 can permit the associate to view the tags and/or items that are detected when performing a scan. For example, the display 820 may indicate the number or type of items detected by the reader 130. Moreover, the display 820 can indicate the status of the RFID reader 130 (if there is a communication error or other malfunction). In another embodiment, an inventory tracking system 835 can provide instructions to the associate using the display 820 such as which items to inventorize next, how to take a corrective action, and positive feedback if the count matches what is expected.

The I/O device 825 permits the associate to control the RFID reader 130. The I/O device 825 could be a keyboard, one or more buttons, a touch screen integrated into the display 820, and the like. In one embodiment, the associate uses the I/O device 825 to instruct the RFID reader 130 to perform an RFID read. Moreover, the associate can change read settings 805 using the I/O device 825 which changes how the RFID read is performed.

The power source 830 can be a portable battery used to power the tray 100 and the RFID reader 130. For example, if the tray 100 is mounted in a cart, the battery can permit the associate to scan RFID tags without having to plug the tray 100 into a power outlet. However, if stationary, the power source 830 may be a power converter that is plugged into a power outlet.

The system 800 also includes a user device 845 that can include a display 850 and scanner 855. The user device 845 can be a personal electronic device such as a tablet, mobile phone, or bar code scanner. The display 850 can be used to receive instructions from the inventory tracking system 835. Using wireless communication, the inventory tracking system 835 can inform the associate carrying the user device 845 when there is a problem with a scan, e.g., when the number of scanned items does not match the expected number. The display 850 may also provide positive feedback so that the associate can move on to a new task.

The scanner 855 can be a bar code scanner which the associate uses to inform the inventory tracking system 835 what items are currently being scanned. For example, the items may be stowed in the warehouse using bins. Before placing the items into the tray 100, the associate may use the scanner 855 to scan a bar code on the bin containing the items. Using an ID determined by the scanning the bin, the inventory tracking system 835 can determine the number of items which should be in the bin. The inventory tracking system 835 can use an item database 840 to track the items in the warehouse. When an item is placed in a bin, the inventory tracking system 835 can update the item database 840. In this manner, the inventory tracking system 835 can know what items are in which bin in the warehouse. Thus, if after performing an RFID read the RFID reader 130 does not identify the same number of items (or detects different items), the inventory tracking system 835 can inform the associate who can perform a corrective action.

The RFID reader 130 includes the read settings 805, an RFID controller 810, and a communication interface 815. The read settings 805 can determine the transmission power used to drive the RFID antenna, the number of read cycles performed when scanning for tags in the tray 100 (e.g., an autostop round count), a sequence of antennas used during the read cycles, whether a wake-up signal is used, and the like. The read settings 805 can also include setting a RF mode (e.g., a "dense mode" mitigates conflict with other nearby readers). Other read settings 805 may include an inventory search mode which configures tag search modes that are tailored to small inventory static environments like shelves or high population dynamic environments. The read settings 805 also can include selecting an inventory session which works with inventory search mode to maintain tag states for tag population management, allowing tags to have different states for multiple readers. The read settings 805 may also include an inventory tag population which is an estimate of the tag population which can be used as a starting point with the inventory algorithm and an inventory select flag that determines which tags respond during the scan, allowing the RFID read to select which tags respond and permits tags to be woken up before reading. The RFID controller 810 may select the read settings 805 to use when scanning for tags in response to a user selection, identifying a type of item, or identifying a type of RFID tag. For example, the RFID controller 810 may use first values for the read settings 805 when scanning for tags placed on watches but use second values for the read settings 805 when scanning tags placed on perfume bottles.

The communication interface 815 permits wireless and/or wired communication with other components in the system 800. For example, the RFID reader 130 may be disposed on, or integrated into, the tray 100. As such, the communication interface 815 may have a wired connection to the display 820 and I/O device 825. However, the communication interface 815 may use wireless communication to communicate information to the inventory tracking system 835 such as the RFID IDs detected when performing an RFID read.

Figure 9:
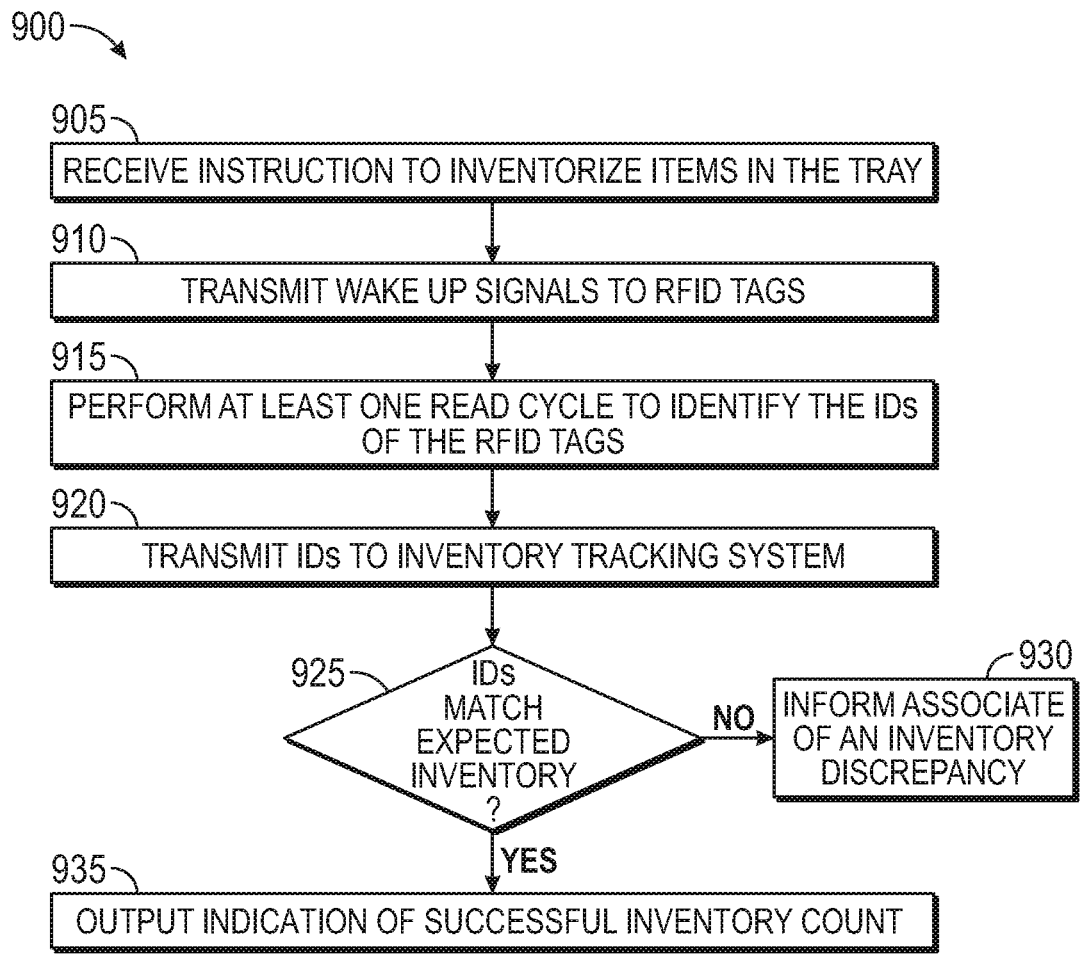
FIG. 9 is a flowchart for inventorying items using an RFID reader tray, according to various embodiments.

FIG. 9 is a flowchart of a method 900 for inventorying items using an RFID reader tray, according to various embodiments. At block 905, the RFID controller receives instruction to inventorize items in the tray (e.g., HRV items). In one embodiment, the instruction is received from an I/O device (e.g., I/O device 825 in FIG. 8) that is integrated onto the tray. For example, the associate may press a button or use a touch pad which instructs the RFID controller to activate the RFID reader to scan for RFID tags in the receptacle of the tray. In another embodiment, the RFID controller may receive the instruction to inventorize the items in the tray from a user device carried by an associate. In this example, the associate may press a button on the user device indicated the items have been placed on the tray, and in response, the user device informs the RFID controller that the scan can be performed.

In one embodiment, the associate places the container holding the items onto the tray so the items can be easily removed from the tray and re-stowed after the scan is performed. For example, the container may be made from a material (e.g., plastic or cardboard) that permits the RFID signals to pass through similar to the material of the bottom support structure. In another embodiment, however, the associate may remove the items from the container (or a location on the shelf) and place the items directly on the tray and then re-stow the items once the scan is complete.

At block 910, the RFID controller sends wake up signals to the RFID tags. In one embodiment, the wake up signals activate the RFID tags to prepare the tags for an upcoming read cycle. For example, the wake up signals may provide power for energizing circuit components on the RFID tag (if the tags are passive). In one embodiment, sending the wake up signals, which is optional, can improve the ability of the tags to respond to the RFID signals sent during a subsequent read cycle.

At block 915, the RFID controller performs at least one read cycle to identify the IDs of the RFID tags. The number of read cycles used to perform a scan may be defined in the read settings. That is, the RFID controller may access the read setting before scanning the items to determine whether the wake-up signal should be used and how many read cycles are used during each scan. For example, each time the associate instructs the RFID controller to perform a scan, depending on the read settings, the RFID controller may instruct the RFID reader to perform one, two, three, or more read cycles. During each read cycle, the RFID reader transmits RFID signals instructing the RFID tags to transmit a RFID reply signal that includes their ID. In one embodiment, the RFID tags are passive which means the tags rely on the received RFID signals to power their internal circuitry in order to transmit the RFID reply signals that include the tag IDs. In another embodiment, the RFID tags are active tags which mean the tags have a power source that can be used to transmit the RFID reply signals or perform other functions in the tags.

One advantage of performing multiple read cycles during each scan is it increases the likelihood that the RFID reader and antenna detect all the items that were placed on the tray. Because of environmental changes and destructive interference, during one read cycle, the RFID reader may not detect all of the items. However, when performing a subsequent read cycle in the scan, the environment or interference may have changed which means the RFID reader may detect RFID tags that were not detecting during the previous read cycle. Thus, by simply repeating the same read cycle, the RFID reader may detect different RFID tags in the tray.

In one embodiment, the RFID controller may change a read setting when performing multiple read cycles. For example, the read settings may indicate a transmission power for the first read cycle which is different from the transmission power used during the second and third read cycles. In another example, if the tray includes multiple RFID antennas, the read settings may indicate different transmission powers for the antennas during different read cycles. For example, some read settings may be better at detecting RFID tags that are further from the bottom support structure of the tray than other settings which are better for detecting RFID tags closer to the bottom support structure. In this manner, the RFID controller can try different read settings for the read cycles in a scan in order to identify all of the RFID tags.

At block 920, the RFID controller transmits the IDs of the RFID tags to the inventory tracking system. As mentioned above, the inventory tracking system can include an item database which tracks the location of the items in a warehouse. Moreover, the item database may correlate each item with one of the RFID tag IDs. For example, when an item enters the warehouse, an associate or machine may place an RFID tag on the item and inform the item warehouse of the correlation. That way, the RFID tag can be used to track the location of the item in the warehouse. When an associate stores the item on a shelf or in a container, the associate can inform the item database. In another embodiment, the items may be tagged before entering the warehouse, for example, the vendor may tag the items before shipping them to the warehouse. The vendor can update the item database to indicate which tag IDs correspond to which items.

At block 925, the inventory tracking system determines if the IDs match the expected inventory. Put differently, the inventory tracking system determines if the items and tags identified by the RFID reader matches the location information stored in the item database. For example, before scanning the items, the associate may have used a bar code scanner or RFID reader to identify a container or location on a shelf which stores the items she will place (or has placed) on the tray. Using this information, the inventory tracking system can query the item database to determine what items are currently stored (or are expected to be stored) in the container or location. For example, the item database may indicate that there are twelve watches stored in the container and the RFID tag IDs corresponding to those twelve watches. The inventory tracking database can compare these expected IDs to the tag IDs detected by the RFID reader in the tray.

If the expected IDs match the IDs detected by the RFID reader, at block 935, the inventory tracking system can output an indication that the inventory count was successful. For example, a display in the tray or on a user device may output a green check mark indicating the count was successful and the associate can proceed to the next task (e.g., scanning items in a different container or location on a shelf). Other types of positive feedback can be given such has haptic feedback or an audible sound. In this manner, the associate can inventorize items without having to perform a visual count.

If the expected IDs do not match the IDs detected by the RFID reader, at block 930, the inventory tracking system informs the associate that there is an inventory discrepancy, which can occur for any number of reasons. In one example, a person may have stolen one of the items. In another example, an associate may have pulled one of the items to fulfill a customer order, but failed to inform the inventory tracking system. For example, the associate may have forgotten to scan a bar code on the item when retrieving the item, and thus, the item database still stores the last location of the item.

In another example, the number of items in the container may match the number of items the item database indicates is in the container, but there still may be an inventory discrepancy. For example, a nefarious actor may have stolen one of the items in the container but replaced it with an empty box or a counterfeit item to hopefully avoid detection of the theft if someone performs a visual inspection of the container. However, because method 900 relies on RFID tags which can be mapped to specific items, these types of inventory discrepancies can be detected. For example, the replacement item may not have an RFID tag, and thus, when performing the RFID read, the RFID reader reports one less item than what is indicated in the item database. Even if the replacement item has an RFID tag, the tag ID may indicate the replacement item is for a different product thereby indicating to the inventory tracking system that one of the items is different from the other items—e.g., is a counterfeit item.

In another example, the inventory discrepancy can be a mis-sort. For example, when stowing received items, an associate may have placed the item in the wrong container. For example, the item may have a similar packaging as the items already in the container, but the item may be a different model or version of the items already in the container, and thus, belongs in a different container. Thus, it would be easy for the associate to place the item in the wrong container. When performing method 900 to inventorize the items in the container, the inventory tracking system can determine that one of the items—i.e., the mis-sorted item—is in the wrong container and inform the associate.

In one embodiment, the method 900 can be used to check items in a container when receiving items at a warehouse or when items are shipped out of the warehouse. For example, a vendor may ship a box that includes multiple RFID tagged items to be stored in the warehouse. At intake, the box may be placed on the tray and scanned to identify the number of items and their types. For example, the inventory tracking system may know from a shipping log that the box is supposed to contain X number of items. If based on the scan, the RFID reader determines that the box contains a different number of items or the tags correspond to a different product than the one expected, the inventory tracking system can inform an associate that there is a discrepancy. In another example, an associate (or a picking machine) may select multiple items from the warehouse to complete a customer order and place them in a box or other type of shipping packaging. Once the order is complete, the box can be placed on the tray to verify that all the requested items are in the box. For example, the inventory tracking system can compare the detect RFID IDs with the order list to ensure the correct items are in the box. In another example, when picking items to complete a customer order, the associate may push a mobile cart which includes the tray around the warehouse to retrieve the items in the customer order. Each time the associate puts an item in the tray, the tray can detect its RFID ID and the inventory tracking system can verify that that item is in the customer order (in case the associate retrieved the wrong item). In addition to using the method 900 in a warehouse, the tray may be used in a retail environment such as a grocery or clothing store to ensure that the items in the tray match the ones paid for by the customer.

Figure 10:
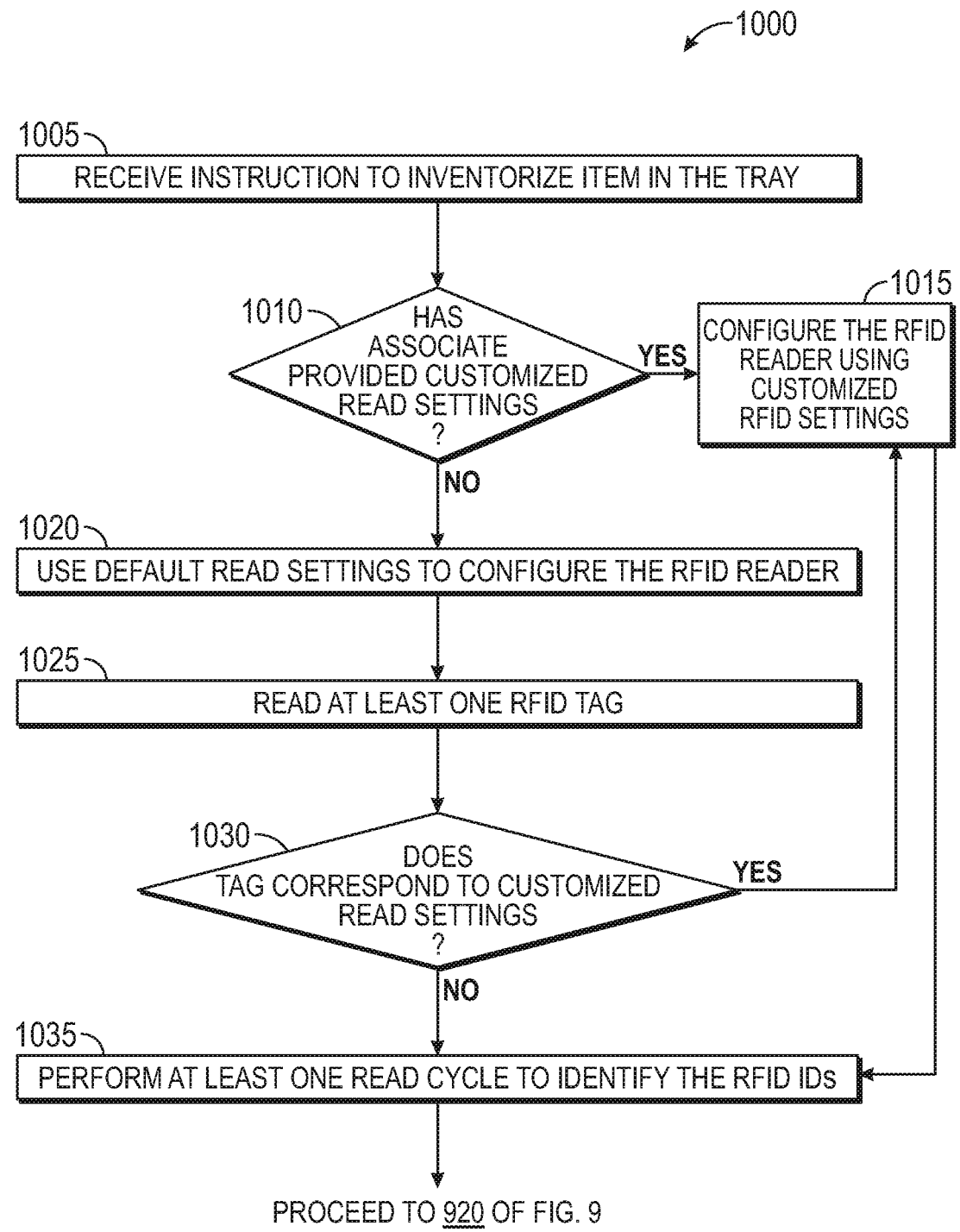
FIG. 10 is a flowchart for customizing RFID settings using by an RFID reader tray, according to various embodiments.

FIG. 10 is a flowchart of a method 1000 for customizing RFID settings using by an RFID reader tray, according to various embodiments. At block 1005, the RFID controller receives instruction to inventorize items in the tray which can come from an I/O device in the tray or a separate user device as described at block 905 of the method 900. At block 1010, the RFID controller determines whether the associate provided customized read settings. That is, the associate may select which read settings are best suited for the particular RFID scan the associate wants to perform. For example, the RFID reader may store multiple different predefined read settings for performing different types of RFID reads. For example, the RFID reader may include first read settings for reading tags on large bulky items, second read setting for reading tags on small liquid items, and third read settings for reading tags on metallic items. Because the associate knows what items are about to be scanned, the associate can select the read settings that best match the item.

In another embodiment, the RFID reader stores different read settings for different types of RFID reads. For example, the associate may want to perform reads where she moves items over the tray rather than placing the items in the tray which are stationary when performing the scan. In another example, the associate may mount the tray on its side on a cart so that the bottom support structure is perpendicular to the floor. The associate can then move the tray close to a shelf to inventorize the items on the shelf without have to remove the items from the self and place them in the tray. Moreover, the associate could push the cart parallel with the shelf to permit the tray to inventorize the items along a row of the shelf. The associate could change the elevation of the tray to scan a different row of the shelf and again push the cart along the length of the shelf. These different types of scans may correspond to different read settings which change the transmission power of the RFID antenna or antennas in the tray, the number of read cycles, whether a wake-up signal is transmitted, and the like. The associate may either enter in the desired values for the read settings or select pre-defined read settings which have been entered previously for scanning different types of items or performing different types of RFID reads.

If the associate provides a customized read setting (e.g., either enters the value manually or selects pre-defined read settings), the method 1000 proceeds to block 1015 where the RFID controller configures the RFID reader using the customized read settings. If not, the method 1000 proceeds to block 1020 where the RFID controller uses default read settings to configure the RFID reader. For example, the default read settings may be set based on the most likely use of the tray, e.g., scanning smaller items (e.g., with dimensions smaller than 10 centimeters) that are stationary on the tray.

In one embodiment, the RFID controller may select the default read settings using a location of the tray in the warehouse. For example, different types of items may be stored at different locations. Thus, if the tray is at a location where there are large items, it may use different default settings than if the tray was at a location which has items with smaller dimensions. The RFID controller may detect the location of the tray using GPS, Wi-Fi, Bluetooth BLUETOOTH®, or real-time locating system (RTLS) where a RTLS tag is attached to the tray.

At block 1025, the RFID reader reads at least one RFID tag using the default read settings. At block 1030, the RFID controller (or the inventory tracking system) determines whether the tag corresponds to customized read settings. That is, RFID controller may use the tag ID to determine the type of item on the tray. For example, the ID may indicate that item is a large purse or an item which include liquid, in which case, the default read settings may not be the best settings for reading the tags. Instead, the method 1000 may proceed to block 1015 where the RFID controller changes from the default read settings and configures the RFID reader using the customized read settings in order to detect the rest of the RFID tags. In this manner, the RFID controller or the inventory tracking system can dynamically change (without associate input) the read settings when scanning the items based on detecting at least one tag on the items which may enable the RFID read to detect the remaining RFID tags on the tray.

In another embodiment, the RFID controller may change the read settings based on the type of tag. That is, different read settings may be better at detecting different types of RFID tags than other read settings since tags can have different antenna shapes, different circuitry, different resistances, etc. For example, when sending items to a warehouse, different vendors may place different RFID tags on their items. Thus, when inventorizing items in the warehouse, the tray may need to detect different types of RFID tags. In one embodiment, the default read settings may be set so as to detect many different types of RFID tags, rather than detecting only one type of tag. However, once the RFID reader uses the default settings to detect at least one tag at block 1025, the RFID controller can identify the tag type and then select the read settings which are best for that tag (assuming the other items in the tray are from the same vendor, and thus, have the same type of RFID tag). At block 1015, the RFID controller can configure the RFID reader using the customized read settings for that particular tag type which may increase the likelihood that the RFID read can detect all the tags currently disposed in the tray.

At block 1035, the RFID reader performs at least one read cycle to identify the RFID IDs using either the default read settings or the customized read settings. Once the scan is complete, the method 1000 can proceed to block 920 of FIG. 9 where the RFID controller transmits the IDs to the inventory tracking system which can provide feedback to the associate.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be used to implement embodiments of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Aspects of the present disclosure are described with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A system, comprising:
a radio frequency identification (RFID) tray comprising:
   a planar bottom support structure,
   a sidewall disposed along a periphery of the bottom support structure, the sidewall being disposed at an angle with respect to the bottom support structure and extending away from the bottom support structure so that a top surface of the bottom support structure and the sidewall form a receptacle for receiving items,
   an RFID antenna,
   a planar shield comprising material that reflects RFID signals emitted by the RFID antenna, wherein the RFID antenna is disposed between the bottom support structure and the shield, and
   an RFID reader configured to:
      energize the RFID antenna to transmit the RFID signals to RFID tags disposed on the items in the receptacle using default read settings for controlling the RFID reader when emitting the RFID signals,
      receive an RFID reply signal from a first RFID tag of the RFID tags, wherein the RFID reply signal includes an ID for the first RFID tag,
      determine that the ID for the first RFID tag corresponds to customized read settings different from the default read settings, and
      perform at least one read cycle while controlling the RFID reader using the customized read settings to receive RFID reply signals from the RFID tags, wherein the RFID reply signals include respective IDs for the RFID tags; and
an inventory tracking system configured to:
   receive the respective IDs,
   detect an inventory discrepancy when the respective IDs do not include an expected ID stored an item database, and
   output an instruction to correct the inventory discrepancy.

2. The system of claim 1, wherein the RFID tray comprises:
a display configured to output the instruction; and
an input/output device configured to receive a user instruction to transmit the RFID signals.

3. The system of claim 1, wherein a material of the bottom support structure permits the RFID signals to propagate through the bottom support structure and into the receptacle, and wherein a material of the sidewall reflects the RFID signals.

4. The system of claim 1, wherein the shield is parallel with the bottom support structure.

5. The system of claim 1, wherein the RFID antenna comprises an electrically conductive cylindrical structure which extends between two opposite sides of an RFID antenna area multiple times, wherein the RFID antenna area is parallel with the bottom support structure, and
wherein the RFID signals emitted by the RFID antenna establish a read region that is above the top surface of the bottom support structure and enclosed within the sidewall.

6. The system of claim 5, wherein the cylindrical structure bends as the cylindrical structure approaches a first side of the two opposite sides of the RFID antenna area to reverse directions and extend towards a second side of the two opposite sides.

7. An RFID tray, comprising:
a bottom support structure;
a sidewall disposed at least partially around and at an angle to the bottom support structure, thereby forming a receptacle for receiving RFID tagged items;
an RFID antenna configured to emit RFID signals to establish an RFID read region within the receptacle for detecting the RFID tagged items, wherein the RFID antenna comprises an electrically conductive annular structure which extends from a first side of an RFID antenna area to a second, opposite side of the RFID antenna area, wherein, as the annular structure extends between the first and second sides, the annular structure extends between a third side of the RFID antenna area and a fourth side of the RFID antenna area opposite the third side multiple times;
a shield comprising a material configured to reflect the RFID signals emitted by the RFID antenna, wherein the RFID antenna is disposed between the bottom support structure and the shield such that the RFID signals emitted towards the shield are at least partially reflected in a direction towards the bottom support structure; and an RFID reader configured to:
  energize the RFID antenna to transmit the RFID signals to the RFID tagged items using default read settings for controlling the RFID reader when emitting the RFID signals,
  receive an RFID reply signal from a first RFID tag of the RFID tagged items, wherein the RFID reply signal includes an ID for the first RFID tag,
  determine that the ID for the first RFID tag corresponds to customized read settings different from the default read settings, and
  perform at least one read cycle while controlling the RFID reader using the customized read settings to receive RFID reply signals from the RFID tagged items, wherein the RFID reply signals include respective IDs for the RFID tags.

8. The RFID tray of claim 7, wherein the shield and the bottom support structure are planar and are parallel with each other.

9. The RFID tray of claim 7, wherein a non-conductive material of the bottom support structure permits the RFID signals to propagate through the bottom support structure and into the receptacle, and wherein a conductive material of the sidewall reflects the RFID signals.

10. The RFID tray of claim 7, further comprising:
a base supporting the bottom support structure and the sidewall, wherein the base contains the RFID antenna and the shield, wherein the base further comprises a port configured to connect the RFID antenna to the RFID reader.

11. The RFID tray of claim 7, wherein the RFID antenna is an omnidirectional antenna, wherein the shield reflects the RFID signals such that the RFID antenna in combination with the shield form a directional antenna.

12. A method, comprising:
receiving an instruction to inventorize RFID tagged items placed in a receptacle of an RFID tray, wherein the receptacle is formed by a bottom support structure and a sidewall disposed on the bottom support structure to enclose at least a portion of the bottom support structure, wherein the sidewall is disposed at an angle with respect to the bottom support structure;
emitting RFID signals into the receptacle using an RFID antenna and default read settings for an RFID reader coupled to the RFID antenna, wherein the RFID antenna is disposed between the bottom support structure and a shield, wherein the shield comprises a material that reflects the RFID signals emitted by the RFID antenna;
detecting at least one ID of the RFID tagged items when using the default read settings of the RFID reader;
determining that the ID corresponds to customized read settings different from the default read settings;
performing, using the RFID antenna, at least one read cycle while controlling the RFID reader using the customized read settings to identify the RFID tagged items; and
receiving RFID reply signals from the RFID tagged items in response to the at least one read cycle, wherein the RFID reply signals comprise respective IDs of the RFID tagged items.

13. The method of claim 12, wherein the shield and the bottom support structure are planar and are parallel with each other.

14. The method of claim 12, wherein a non-conductive material of the bottom support structure permits the RFID signals to propagate through the bottom support structure and into the receptacle, and wherein a conductive material of the sidewall reflects the RFID signals.

15. The method of claim 12, wherein emitting the RFID signals comprises:
transmitting wake up signals to the RFID tagged items; and
performing multiple read cycles requesting the RFID tagged items transmit the respective IDs.

16. The method of claim 12, further comprising:
detecting an inventory discrepancy when the respective IDs do not include expected IDs; and
output a corrective action to a user for correcting the inventory discrepancy.

\* \* \* \* \*

UNITED STATES PATENT AND TRADEMARK OFFICE
CERTIFICATE OF CORRECTION

| | |
|---|---|
| PATENT NO. | : 10,402,600 B1 |
| APPLICATION NO. | : 15/798103 |
| DATED | : September 3, 2019 |
| INVENTOR(S) | : James Gergory Martin et al. |

Page 1 of 1

It is certified that error appears in the above-identified patent and that said Letters Patent is hereby corrected as shown below:

On the Title Page

In item (72), in Column 1, in "Inventors", Line 1, delete "James Gergory Martin" and insert -- James Gregory Martin --, therefor.

Signed and Sealed this
Fifteenth Day of October, 2019

Andrei Iancu
*Director of the United States Patent and Trademark Office*